United States Patent [19]

Banucci et al.

[11] 4,187,361

[45] Feb. 5, 1980

[54] METHOD FOR PREPARING POLYPHENYLENE OXIDES WITH MANGANESE-VINYL RESIN COMPLEXES

[75] Inventors: Eugene G. Banucci, Scotia; Walter K. Olander, Clifton Park, both of N.Y.

[73] Assignee: General Electric Company, Pittsfield, Mass.

[21] Appl. No.: 917,795

[22] Filed: Jun. 22, 1978

Related U.S. Application Data

[62] Division of Ser. No. 753,562, Dec. 21, 1976, Pat. No. 4,110,312.

[51] Int. Cl.$^2$ .................................................. C08F 8/42
[52] U.S. Cl. ............................................ 525/4; 526/904; 528/212; 528/217; 525/332; 525/334; 525/360; 525/4

[58] Field of Search ............................ 526/47, 19, 21; 528/215

[56] References Cited

U.S. PATENT DOCUMENTS

| | | | |
|---|---|---|---|
| 3,787,361 | 1/1974 | Nakashio et al. | 260/47 ET |
| 3,956,242 | 5/1976 | Olander | 260/47 ET |
| 3,962,181 | 6/1976 | Sakouchi et al. | 260/47 ET |
| 3,965,069 | 6/1976 | Olander | 260/47 ET |
| 4,075,174 | 2/1978 | Olander | 528/215 |
| 4,083,828 | 4/1978 | Olander | 528/215 |

*Primary Examiner*—William F. Hamrock
*Attorney, Agent, or Firm*—Morgan, Finnegan, Pine, Foley & Lee

[57] ABSTRACT

A novel method is disclosed for the preparation of polyphenylene oxides by the oxidative coupling of phenolic monomers which is based on the use of a manganese-vinyl resin complex as a catalyst.

12 Claims, No Drawings

METHOD FOR PREPARING POLYPHENYLENE OXIDES WITH MANGANESE-VINYL RESIN COMPLEXES

This is a division, of application Ser. No. 753,562 filed Dec. 21, 1976, now U.S. Pat. No. 4,110,312.

This invention provides a novel method for the preparation of polyphenylene oxides by the oxidative coupling of phenolic monomers in the presence of a manganese vinyl resin complex.

BACKGROUND OF THE INVENTION

The polyphenylene oxides and methods for their preparation are known in the art and are described in numerous publications, including Hay U.S. Pat. Nos. 3,306,874 and 3,306,875. The Hay processes are based on the use of copper-amine complexes. Polymerization techniques for the preparation of polyphenylene oxides are disclosed in McNelis, U.S. Pat. Nos. 3,220,979; Olander, 3,956,242; Nakashio, 3,573,257; and Nakashio, 3,787,361. Some of the prior art oxidative coupling reactions are based on the stoichiometric oxidation of $PbO_2$ and $MnO_2$ which do not function as catalysts in those processes.

In the applicant's copending applications Ser. Nos. 491,370 filed July 24, 1974 and 534,903, filed Dec. 20, 1974, there are disclosed novel procedures for polymerizing polyphenylene oxides with complex manganese based catalysts. All of these patents and applications are hereby incorporated by reference.

The procedures which have employed manganese based catalysts have been based on the use of both complexed and uncomplexed catalysts that form substantially homogeneous type polymerization mixtures. These mixtures are usually subjected to a batch type bulk polymerization and after the polymer reaches the desired molecular weight, the reaction is terminated. The catalyst or polymer must be separated from the reaction mixture by means of an antisolvent or extraction-separation technique which results in catalyst losses that prevent reuse of the catalyst and add substantially to the cost of the process. Accordingly it would be advantageous to prepare an active catalyst that is heterogeneous with a solution of a phenolic monomer so that a fixed bed polymerization process may be carried out. This type of process may be operated continuously, eliminates the need to separate the polymer-catalyst mixture and permits reuse of the heterogeneous catalyst composition. Should the bed begin to lose its activity after a period of operation, re-coordination of the lost manganese should restore the catalyst bed to its former efficiency.

It has been found that a useful heterogeneous catalyst for the oxidative coupling of phenolic monomers comprises a manganese complex that is formed from a manganese (II) compound and a crosslinked vinyl resin having units that contain a benzoin oxime group. These catalysts may be used in a fixed bed and substantially eliminates the need to carry out a separate separation step to obtain the polymer solution free of catalyst.

Accordingly, it is a primary object of this invention to provide a heterogeneous catalyst system for the polymerization of phenolic monomers into polyphenylene oxide resins.

It is also a further object of this invention to provide a heterogeneous polymer-bound catalyst system that includes complexed manganese.

DETAILED DESCRIPTION OF THE INVENTION

This invention provides a novel heterogenous polymer-bound catalyst which comprises a manganese (II) complex that is formed from a manganese (II) compound and a crosslinked vinyl resin having units that contain a benzoin oxime group. This catalyst is useful for the oxidative coupling of phenolic monomers under polymer forming reaction conditions in the presence of an organic solvent to form a polyphenylene oxide resin.

The manganese complex is preferably formed from a manganese (II) compound and a crosslinked vinyl resin having benzoin oxime groups. The vinyl resins may be preformed and the benzoin oxime groups may be added to the polymer background using various reagents or the vinyl resins containing benzoin oxime groups may be prepared from a suitable benzoin oxime moiety that may be employed as a monomer that is made into a suitable homopolymer or copolymer. The vinyl resins include those resins which have pendent phenyl groups and are derived from at least one vinyl monomer which may be selected from the group consisting of vinyl chloride, alpha-olefins such as ethylene, propylene, 2-butene, 2-pentene, styrene, chloro styrene and the like. The crosslinking of the vinyl resin is carried out to insure that the polymer bound catalyst is insoluble in the polyphenylene oxide polymerization solvent and may be effected by the use of unsaturated crosslinking agents such as divinylbenzene or by the use of a suitable catalyst such as a peroxide or by the use of ionizing radiation in accordance with standard techniques.

The preferred crosslinked vinyl resins that are modified to incorporate benzoin oxime units are those crosslinked resins which contain at least 25% styrene units of the formula:

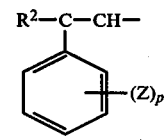

wherein $R^2$ is hydrogen, lower alkyl of from 1 to 6 carbon atoms a halogen; Z is vinyl, halogen, lower alkyl of from 1 to 6 carbon atoms and lower alkyl halogen of from 1 to 6 carbon atoms wherein the halogen is chlorine or bromine. Included in the above formula are crosslinked homopolystyrene, polychlorostyrene; rubber modified polystyrenes; styreneacrylonitrile copolymers; styreneterpolymers, such as styrene-acrylonitrilebutadiene terpolymers, or divinylbenzene-styrene-methymethacrylate terpolymers; polyalphamethylstyrene; copolymers of ethylvinylbenzene, divinylbenzene and the like.

The crosslinked vinyl resins when modified to include a benzoin oxime moiety will preferably include for at least 1% of their units, a unit of the formula:

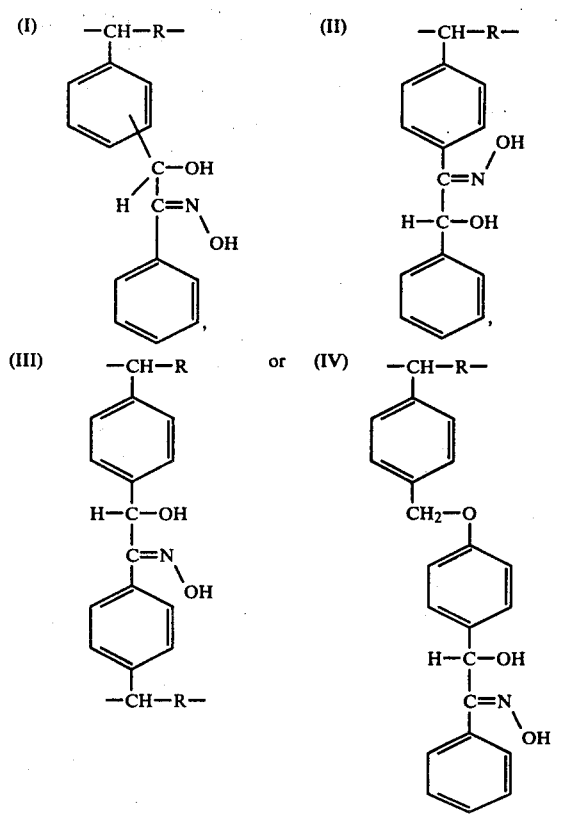

wherein R is the residue of a crosslinked styrene resin.

Crosslinked styrene units having units of Formula I may be prepared according to the following procedure:

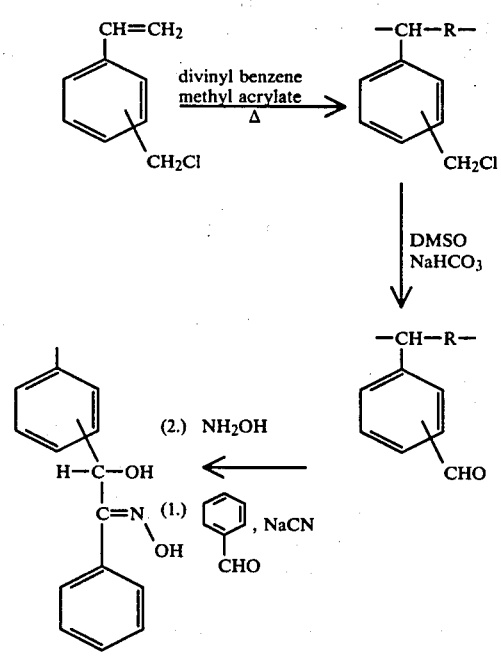

wherein R represents the residue of the crosslinked terpolymer of vinylbenzylchloride, divinylbenzene and methylacrylate.

Crosslinked styrene resins having units of Formula II may be prepared directly from a crosslinked styrene resin such as a styrene-divinylbenzene-methylmethacrylate resin according to the following procedure:

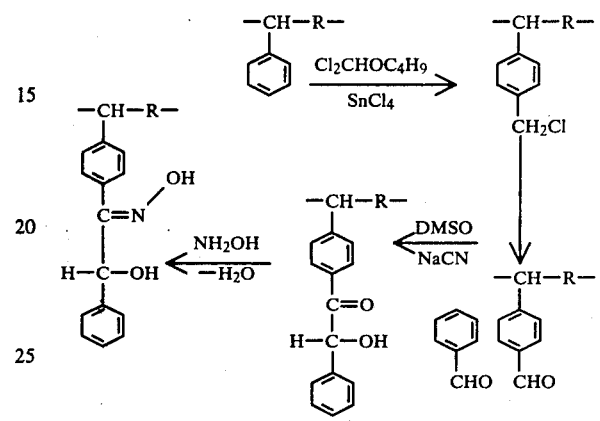

wherein R represents the residue of the crosslinked terpolymer of styrene, divinylbenzene and methylmethacrylate.

The crosslinked styrene resin of Formula III may be prepared as follows:

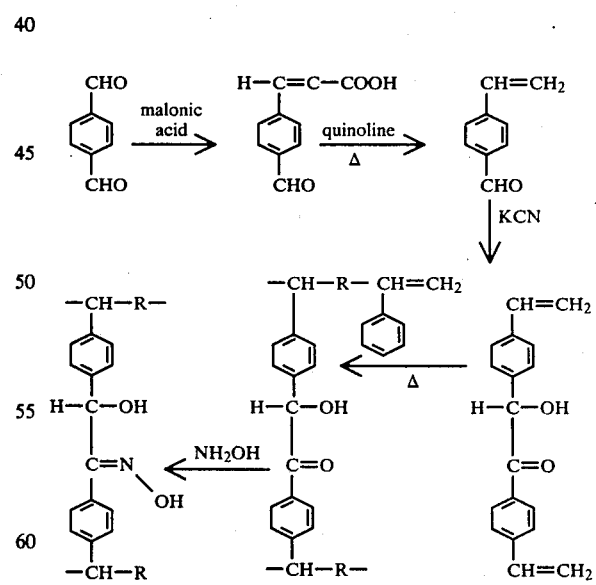

wherein R is the residue of the crosslinked styrene resin.

Crosslinked styrene resin of Formula I may also be prepared as follows:

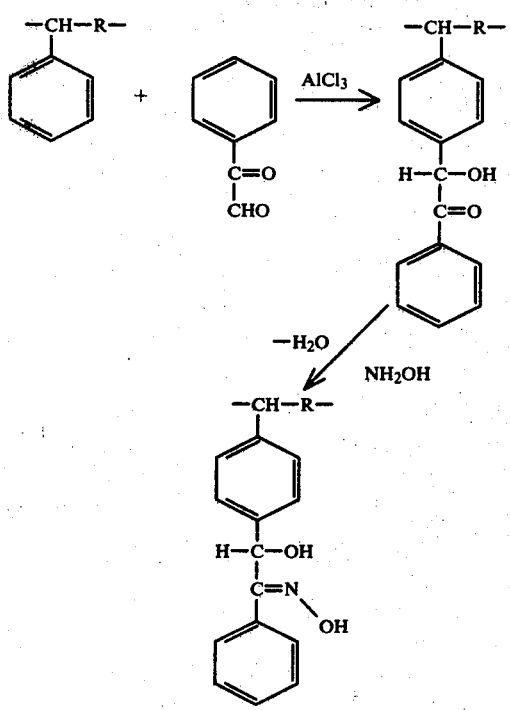

wherein R is the residue of a crosslinked styrene resin.
The styrene resins of Formula IV may be prepared according to the following procedure:

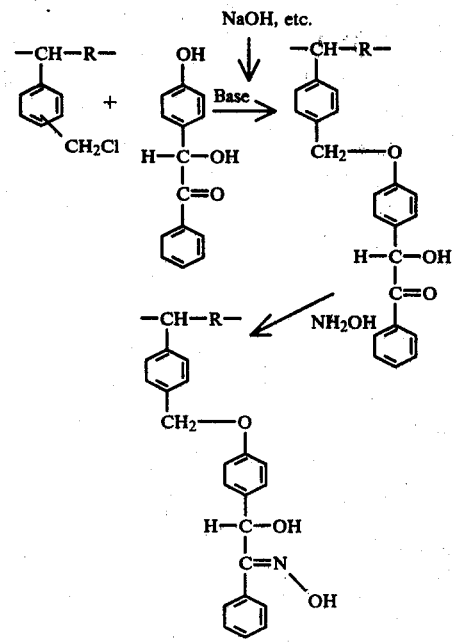

wherein R is the residue of a crosslinked styrene resin.

The number of units in a particular crosslinked styrene resin should be at least sufficient to form a catalytically active complex with a manganese compound. The catalytic activity of the complex is to be measured as a function of the ability of the complex to catalyze the oxidative coupling of phenolic monomers such as 2,6-xylenol. Generally it is only necessary for only at least 1% of the units to be of Formula I, II, III or IV but is preferred to have from about 5 to about 20% or up to about 50% of the units of the cross-linked styrene resin in configuration of Formula I, II, III or IV.

The manganese (II) compounds are preferably selected from a manganese (II) compound selected from the group consisting of manganese (II) chloride (also known as manganous chloride) manganese (II) bromide, manganese (II) iodide, manganese (II) carbonate, manganese (II) sulfate, manganese (II) acetate, manganese (II) nitrate and manganese (II) phosphate.

Generally the catalytically active complexes may be formed by combining the crosslinked styrene resins having the benzoin oxime functional units in excess of the theoretical stoichiometric amount of the styrene resin benzoin oxime that will form a complex with the manganese (II) compound. The complex may be preformed in a separate reactor or it may be formed in situ in the polymerization vessel prior to the addition of the the phenolic monomer. Generally a molar ratio of phenolic monomer to manganese of 10:1 to 1000:1 and more preferably from 100:1 to 500:1 may be employed in the practice of the invention.

The phenolic monomers may be of the formula:

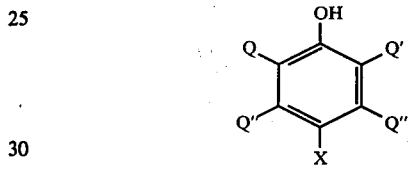

wherein X is a substituent selected from the group consisting of hydrogen, chlorine, bromine and iodine; Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q and in addition may be halogen and Q" are each as defined for Q' and in addition may be hydrogen, with the proviso that Q, Q' and Q" are all free of a tertiary carbon atom.

The preferred phenolic monomer is 2,6-xylenol.

The novel complexes of the invention may be employed in the oxidative coupling of phenolic monomers in a batch type or in a continuous type polymerization process. The catalyst may be separated from a batch reaction process by filtration, centrifugation etc. after neutralization of the reaction medium. If this technique is employed the crosslinked styrene resin containing benzoin oxime units will have to be regenerated by the addition of appropriate manganese (II) compound. In a continuous process, it is contemplated that a solution of the phenolic monomer will be passed through fixed bed of catalyst under polymer forming conditions that will result in the production of a solution of a polyphenylene oxide polymer. The heterogeneous manganese complexes are used in a basic reaction medium, preferably under anhydrous conditions. The source of the alkalinity may be provided by a strong alkali metal base, e.g. alkali metal hydroxides, alkali metal alkoxides, etc., or mixtures thereof. Commercially available alkali metal bases which are readily obtained are presently preferred, such as sodium hydroxide, potassium hydroxide, lithium hydroxide, sodium methoxide, etc. The quantity of alkali metal base which is essential to the promotion of the oxidative coupling of the phenolic monomer which is required can readily be determined without undue experimentation by those skilled in the art. In general, however, suitable phenol: alkali metal base mole ratios of from about 1:1 to 100:1 preferably from about 40:1 to about 5:1 and even more preferably from about 20:1 to about 10:1. In the preparation of polyphenylene oxide from 2,6-xylenol, optimum overall process reaction conditions, generally, establish the desirability of employing a 2,6-xylenol: alkali metal hydroxide mole ratio within the range of from about 14:1 to about 18:1 may be employed.

The reaction temperatures employed in the preparation of polyphenylene oxides in the presence of the catalyst of this invention can be varied widely. Suitable polymerization temperatures generally fall within the range of from about 0° to about 50° C., preferably within the range of from about 10° to about 40° C., and more preferably within the range of from about 20 to 30° C. since generally optimum self-condensation temperatures have been found to exist in this range. If desired superatmospheric pressure may be employed with higher reaction temperatures. Higher pressures e.g., 1 to 40 psig, 1 to 1000 psig or even higher pressures may be employed.

The process of the invention is carried out by combining the phenolic monomer, a solvent and the catalyst in a suitable reactor. Suitable solvents for the reaction are described in U.S. Pat. No. 3,956,242. If desired a phase transport agent, i.e., methyl-tri-n-octylammonium chloride as described in copending application Ser. No. 651,682 may be employed with or without a secondary amine as described in copending application, identified by U.S. Pat. No. 4,083,828, both of which are incorporated by reference.

DESCRIPTION OF THE PREFERRED EMBODIMENTS

The following examples illustrate the invention. They are merely illustrative and are not to be construed to limit the invention in any manner whatsoever.

EXAMPLE 1

A crosslinked styrene resin having units of Formula I according to the following procedure:

To a 500 ml three necked flask fitted with a mechanical stirrer, reflux condenser and a thermometer was added 200 mls of distilled water, 0.02 g of sodium lauryl sulfate, 1 g carboxy methyl cellulose ether sodium salt and 2.4 g sodium sulfate. The foamy solution is heated to 50° C. and 60 g (0.39 moles) of vinyl benzyl chloride, 20 g (0.23 moles) methyl acrylate, 0.8 g divinyl benzene (1% by weight); 0.6 g of stearic acid, and 0.5 g AIBN are added while stirring at 500 RPM. Stir 24 hours at 50° C. and 8 hours at 65° C. Let cool and isolate material via slow filtration to yield fine particulate beads. 48.5 g 60% yield. Theoretical analysis C 67.34, H 6.18, Cl 17.28. Found C 69.0, H 6.6, Cl 18.1.

Using a 2 liter flask fitted with the same accessories as above was added 47 g (4.8 moles of functionality/g) of vinyl benzyl chloride copolymer and slurried in 825 ml of dimethyl sulfoxide. To this was added 56.4 g (0.671 moles) of sodium bicarbonate (3 mol excess), and the slurry heated to 155° C. for 16 hours. The product was isolated by filtration when cool and purified by H$_2$O trituration to remove excess NaHCO$_3$. Collected 36.8 g dry. Theoretical analysis C 74.8, H 6.33, Found C 74.5, H 7.1.

In a one liter flask fitted with the same accessories employed above was placed 36.2 g (4.8 moles of aldehyde functionality/g) of beads, 31.3 g (0.295 moles) of benzaldehyde, 29.84 g (0.609 moles) sodium cyanide all slurried in 500 ml of DMSO. Mixture, under N$_2$ atmosphere, was heated to 93° C. for 4½ hours and allowed to cool overnight. The solids were removed, by filtration followed by H$_2$O trituration and dried in vacuum oven at 70° C. Collected 42 g of brownish bead. Theoretical analysis C=76.86, H=5.56. Found C=76.0, H=6.6.

In a two liter flask with the same accessories as previously used and a nitrogen bypass was placed 41.63 g (4.8 mmoles of benzoin/g) of beads slurried in 525 ml DMSO. In a separate flask was added 69.4 g (0.6 moles) hydroxylamine hydrochloride slurried in 400 ml methanol to which was added 129.6 g (0.6 moles) 25% solution of sodium methoxide. After stirring for 10 minutes the slurry was filtered through celite to remove NaCl and the filtrate added directly to the flask. The slurry was heated to 75° C. for 20 hours and then filtered when cool. Trituration of the beads was done in H$_2$O and MeOH followed by a CH$_2$Cl$_2$ wash. The filtrate was dried in a vacuum oven at 70° C. to yield 39.4 g of beads. Theoretical analysis C=72.68, H=6.11, N=4.58. Found C=72.3, H=6.9, N=2.0.

EXAMPLE 2

The crosslinked styrene resin of Example 1 was employed to prepare a catalytic complex with manganese (II) chloride. A threefold excess i.e., 1.15 mole of benzoin oxime units/g of crosslinked styrene resin was employed to minimize the possibility of uncoordinated manganese functioning as a catalyst. The polymerization was based on 50 g of 2,6-xylenol (0.4098) mole at a molar catalyst ratio of 100:1, i.e., 0.004098 moles of MnCl$_2$. Anhydrous conditions are maintained including the use of pelletized sodium hydroxide.

The following materials are used:

| | |
|---|---|
| 2,6-xylenol | 50.0 g |
| methanol | 110 ml |
| toluene | 560 ml |
| sodium hydroxide | 1.0 g (pellet) |
| MnCl$_2$ | 0.515 g |
| crosslinked styrene resin containing benzoin oxime units (Example 1) | 10.68 g |

The crosslinked styrene resin containing benzoin oxime units is combined under nitrogen with a portion of the toluene and is held at ambient conditions for about 18 hours to allow swelling of the resin beads. About 60 minutes before the polymerization 0.515 g MnCl$_2$ in about 75 ml methanol is added to the agitated reactor. The 2,6-xylenol dissolved in the remainder of the toluene, oxygen flow is set at 1–2 SCFH and the sodium hydroxide is added in admixture with the balance of the methanol. A peak exotherm temperature of 30° C. is maintained during approximately the first 60 minutes after which the temperature is not allowed to fall below 25° C. At 120 minutes the reaction is quenched at twice the molar NaOH concentration and the manganese chloride is extracted as manganese acetate. The poly (2,6-dimethyl-1,4-phenylene oxide) is recovered from the toluene solution by antisolvent precipitation with methanol and has an intrinsic viscosity of 0.48 dl/g as measured in chloroform at 25° C.

EXAMPLE 3

A crosslinked styrene resin having units of Formula III was prepared as follows:

In a 500 ml three necked flask fitted with thermometer, mechanical stirrer and reflux condenser was added 10 g (0.154 moles) potassium cyanide dissolved in ethanol (300 mls) and $H_2O$ (60 mls). The solution was cooled to 0°-5° C. at which time was added 26.3 g (0.198 moles) of p-formyl styrene (6) in one portion. The mixture was allowed to warm to room temperature at which time a yellow solution was obtained. During 20 hours of stirring a copious precipitate formed that was isolated by filtration. Two fractions were collected, both of the same purity of thin layer chromotography done in chloroform solvent: p-formylstyrene ($R_f$=0.9), 4,4'-divinylbenzoin ($R_f$=0.5) The material was purified by cold trituration in pentane Mp 92°-5°. Collected 17.3 g for a 66.3% yield.

In a 500 ml three necked flask fitted with mechanical stirrer and reflux condenser was added 160 ml distilled water, 0.016 g sodium lauryl sulfate, 0.8 g carboxy methyl cellulose ether sodium salt and 1.92 g sodium sulfate. The solution was heated to 75° C. and while stirring at 750 RPM, 7.13 g (0.02 moles) 4,4'-divinylbenzoin, 46.24 g (0.444 moles) styrene, 0.48 g stearic acid and 0.4 g AIBN was added in sequence. The reaction was heated at 75° for 24 hours and 85° C. for 24 hours. The reaction was cooled and homogeneous beads (1/32-1/16") were isolated. Collected 48 g of beads. Theoretical analysis C=90.84, H=7.46. Found C=90.1, H=7.8.

The benzoin oxime was made exactly as described in Example 1. To a 300 ml three necked flask fitted with previously stated accessories was added 48 g (7.13 g of benzoin assuming 100% incorporation into polymer) of beads slurried in 160 ml DMSO. To this was added the hydroxylamine solution made by reacting 5.56 g of hydroxylamine hydrochloride with 17.28 g (25% solution in methanol) sodium methoxide. Heated to 75° C. for 20 hours and the reaction was allowed to cool. Filtered off solids followed by a hot DMSO wash and a methanol trituration. Filtered to collect 38.75 g of beads. Theoretical analysis C=90.2%, H=7.5%, N=0.7%. Found C=88.8%, H=7.9%, N=0.4%.

EXAMPLE 4

A crosslinked styrene resin of Formula I was prepared by acylating commercially available crosslinked polystyrene beads as follows:

Preparation of Crosslinked Polystyrene Beads

Both 2% and 8% divinylbenzene crosslinked polystyrene beads were obtained from Dow Chemical and washed extensively before use. A trituration was done in INNaOH at 60° C., INHCl at 60° C., $H_2O$ at 40° C., methanol and $CH_2Cl_2$ at 25° (JACS 96, 6469 (1974). Analysis: theoretical C=92.3, H=7.7, Found C=92.0, H=8.1.

Preparation of Phenylglyoxal

Phenylglyoxal can be prepared to two methods both of which report around 70% yields. The simplest method is the oxidation of acetophenone in a dioxane medium (Org. Syn. Vol. II 1943, p. 509-11). A second more complicated but inexpensive route involves the preparation of a phenylglyoxal hemimercaptal intermediate with subsequent hydroylsis to the product (Org. Syn. Vol. V 1973, p. 937-40).

Acylation of 2% Crosslinked Beads

In a two liter, three-necked flask fitted with mechanical stirrer, thermometer and a pressure equilibrated addition funnel was placed 65.04 g (n=1.625 moles) 2% cross-linked polystyrene beads (16-25 mesh), and 166.25 g (1.25 moles) anhydrous aluminum chloride slurried in 1300 ml of dry methylene chloride. This mixture was cooled to 0°-5° C. at which time 83.8 g (0.625 moles) phenylglyoxal in 50 ml $CH_2Cl_2$ was added dropwise over a 45 minute span with efficient stirring. The orange slurry was allowed to return to ambient over 12 hours. Decantation of the aluminum chloride slurry left black beads behind for filtration. The beads were triturated in $H_2O$ for one hour to yield an orange bead during the exothermic hydrolysis (40° C.). Subsequent filtration followed by a MeOH and $CH_2Cl_2$ wash yielded 82 g of dry beads. Analysis; theoretical C=80.7, H=5.9, Found C-79.6, H=6.6.

Oximination of 2% Crosslinked Acylated Beads

In a 250 ml round bottom fitted with reflux condenser, $N_2$ inlet, magnetic stirring and an oil bath was placed 5 g (0.021 moles assuming 100% conversion in acylation reaction) benzoin-polystyrene beads slurried in 80 ml dimethyl sulfoxide. Free hydroxylamine was generated in a separate flask by reaction of 5.83 (0.084 moles) hydroxylamine hydrochloride in 25 ml of MeOH with 22.68 g (0.084 moles) 25% solution of sodium methoxide. The mixture was stirred for 10 minutes and the solids removed by filtration through celite and the filtrate added directly to the flask. A maroon slurry develops instantly and the mixture is heated to 75° C. for 20 hours. After cooling the suspension is filtered, triturated in $H_2O$ and MeOH followed by a $CH_2Cl_2$ wash to yield 4.5 g of yellow beads. Analysis: theoretical C=75.9, H=5.9, N=5.9; Found C=79.8, H=6.8, N=2.5. This corresponds to a 42% yield of benzoin oxime based on nitrogen incorporation. The bead oxime activity is 2.51 meq/g.

Analogous oximination reactions in chloroform and methylene chloride are included in the accompanying table.

TABLE

| | Oximination Solvent Study | | | | | |
|---|---|---|---|---|---|---|
| | Found | | | Theo | | |
| Solvent | C | H | N | C | H | N |
| DMSO[a] | 74.9 | 6.9 | 2.7 | 75.9 | 5.9 | 5.9 |
| DMSO | 79.8 | 6.8 | 2.5 | 75.9 | 5.9 | 5.9 |
| $CHCl_3$ | 80.4 | 6.7 | 2.6 | 75.9 | 5.9 | 5.9 |
| $CH_2Cl_2$ | 79.9 | 6.7 | 2.5 | 75.9 | 5.9 | 5.9 |

[a]In situ generation of hydroxylamine by reaction of $Na_2CO_3$ and hydroxylamine hydrochloride.

EXAMPLE 5

Benzoin oxime modified polystyrene beads and ca. 200 ml toluene are combined in a 500 ml r.b.f. and agitated for 12-24 hours on a mechanical shaker. A methanol solution (ca. 25 ml MeOH) of manganese acetate tetrahydrate and pyridine is added and agitation continued another 12-24 hours. Generally the beads turn dark green or black after several hours contact. No precaution to exclude air is made. The beads are collected on a wire screen and thoroughly washed with toluene, and dried at 60° C. in a vacuum oven.

The results of several coordination experiments are summarized in the table below:

| Case | Formula | Benz. Ox. Modified PS Beads (g.) | Mn(OAc)$_2$ . 4H$_2$O (g) | Pyridine (g.) | m. mole Benzoin Oxime/ g. Support | Weight Percent Manganese Incorporation | |
|------|---------|----------------------------------|---------------------------|---------------|-----------------------------------|-------------------|-------|
|      |         |                                  |                           |               |                                   | Expected | Found |
| A | I | 10.8(Ex. 4) | 2.10 | 2.59 | 2.28 | 3.59 | 3.05 |
| B | III | 14.78(Ex. 3) | 1.04 | 1.34 | 0.288 | 1.47 | 0.68 |
| C | I | 10.0(Ex. 4) | 0.76 | 0.97 | 0.39 | 1.57 | 0.71 |
| D | I | 10.0(Ex. 4) | 1.49 | 1.92 | 0.37 | 1.88 | 0.67 |
| E | I | 10.0(Ex. 4) | 2.18 | 2.81 | 0.43 | 2.16 | 1.22 |
| F | I | 10.0(Ex. 4) | 2.85 | 3.79 | 1.34 | 5.02 | 2.04 |
| G* | 2% Cross-Linked XPS Beads 16-25 Mesh | 10.0 | 0.76 | 0.97 | None | None | 0.01 |
| H* | 2% Cross-Linked XPS Beads 16-25 Mesh | 10.0 | 2.85 | 3.79 | None | None | 0.01 |

*control

The pyridine to manganese molar ratio is constant at 4:1. It is assumed that several moles of pyridine may be associated with each manganese on the catalyst bead. Similar experiments in which the amine is excluded or substituted also yield a dark colored bead. This example demonstrates the benzoin oxime modified polystyrene beads are capable of binding considerable quantities of manganese. By comparison, only trace amounts of manganese are incorporated when unmodified commercial cross linked polystyrene beads, cases G and H, are used.

EXAMPLE 6

A polymerization combining:

| Component | Quantity (g) | Moles |
|-----------|-------------|-------|
| 2,6 xylenol | 15.0 | 0.1229 |
| Methanol | 23.0 | |
| Toluene | 120.0 | |
| 50% aq. NaOH | 0.9 | 0.0112 |
| FormulaI Benzoin Oxime Modified PS Beads (2.9-3.05 wt. % Mn) | 2.23 | 0.0013 (Mn) | is carried out in a 250 ml resin kettle reactor equipped with an overhead stirrer, oxygen inlet and thermocouple probe.

The beads are swollen in 100 ml toluene 16 hours in the reactor. The remaining toluene is added with the 2,6 xylenol. The base is dissolved in 15.0 g methanol. Oxygen is added through the dip tube at 0.05 SCFH for 5 minutes preceding base addition and initiation of the polymerization. The reaction temperature increased from 23.3 to 30 over a 6 hour period. The remaining 8 g methanol is added after 2 hours.

A portion of the reaction solution was withdrawn after 6 hours and neutralized with aqueous acetic acid. After precipitation with methanol, the Polyphenylene oxide is redissolved in toluene and precipitated with methanol again. This is required to remove an polystyrene bead contaminants entrained with the polyphenylene oxide. The main reaction solution is diluted with toluene and passed through a suitable wire screen to retain the catalyst beads. The beads are further washed with toluene and dried in a vacuum oven. The concentration of manganese remaining in the beads is 2.4 weight percent or 82.8 percent of the original amount. This number may be low in that some amount of PPO is absorbed in the bead. The polymer has an I.V. of 0.13 dl/g in chloroform at 30° C.

EXAMPLE 7

A polymerization combining:

| Component | Quantity (g) | Moles |
|-----------|-------------|-------|
| 2,6 Xylenol | 15.0 | 0.1229 |
| Methanol | 20.0 | |
| Toluene | 120.0 | |
| 20% aq. NaOH | 0.9 | 0.0112 |
| Formula III | 7.31 | 0.0012 |
| Benzoin Oxime Modified PS Beads .67-.68% Manganese | | (Manganese) | was carried out similary to example 6.

The catalyst beads are pre-swollen in toluene for 16 hours and combined with a toluene solution of 2,6 xylenol and a methanol solution containing the base in the reactor used in example 6. An oxygen flow of 0.075 SCFH is maintained. The reaction temperature increased from 20° to 30° C. during the next 15 hours before holding steady at 24.4° C. After 5.7 hours a reaction aliquot was withdrawn, neutralized with acetic acid, and precipitated with methanol. The I.V. of the reprecipitated polymer is 0.17 dl/g in chloroform at 30° C.

The main body of the reaction is diluted with toluene and filtered through a wire mesh screen to collect the catalyst beads. The beads are triturated with toluene and dried at 60° C. under vacuum. The manganese concentration in the beads is 0.6 weight percent or 85.2 percent of the original amount. An exact manganese determination is difficult because of polymer entrained with the beads and loss of smaller beads which occurs in the recovery step.

EXAMPLE 8

All four reactions in example 8 are based on 50 g 2,6 xylenol (0.4098 mole) at a molar catalyst ratio of 100:1; i.e. 0.0041 moles MnCl$_2$. Anhydrous conditions are maintained including the use of pelletized sodium hydroxide, 1.0 g (0.025 mole). Solvent and solvent composition are varied somewhat including the addition of di-n-butylamine and a phase transfer agent, aliquat 336.

The catalyst support, formula III used in cases A-D is recovered from the acetic acid neutralized polymer solutions after each polymerization by use of a wire screen. The recovered catalyst support was extracted twice with toluene and once with methanol, filtered, dried, and weighed. Fresh catalyst support to yield a final weight of 14.2 g is added before the next run. The acid neutralization employed to quench to polymerization also extracts the manganese as Mn(OAc)$_2$. New MnCl$_2$, 0.515 g, is introduced before each polymerization.

Analysis of the beads is consistent with 0.288 m mole benzoin oxime/g. polystyrene support. A 1:1 molar stoichiometry with manganese requires 14.2 g benzoin oximepolystyrene (BZO-PS) chelate.

In all cases the benzoin oxime modified chelate is combined under nitrogen with a portion of the reaction solvent, either neat toluene or chlorobenzene, approximately 18 hours in advance to allow adequate bead swelling. Approximately 60–90 minutes before the polymerization 0.515 g MnCl$_2$ in about 75 ml methanol is added to the reactor, equipped with an overhead stirrer, condenser, thermometer, and dip tube for oxygen.

The following sequence is adhered to in adding the remaining materials, the 2,6 xylenol solution, oxygen flow is set at 1–2 SCFH, and the methanolic NaOH solution. A peak exotherm temperature of 30° C. is maintained during approximately the first 60 minutes after which the temperature is not allowed to fall below 25° C. At 120 minutes aqueous acetic acid, at twice the molar NaOH concentration, is added to quench the reaction.

The benzoin oxime modified polystyrene catalyst support was used a total of four times The cycle steps included 2,6 xylenol polymerization, manganese extraction, filtration, PPO extraction, filtration and drying. Reaction parameters and supportive data are summarized in the Table.

| Polymerization of 2,6 Xylenol Using a Manganese BZO-PS Catalyst Support | | | | | |
|---|---|---|---|---|---|
| | Reaction Composition (Weight percent) | | | I.V. at[2] 120 | Yield Catalyst |
| Case | 2,6 Xylenol | MeOH | Solvent | min. | Support (g) |
| A | 5.0 | 12.0 | 83.0 C$_6$H$_5$Cl | 0.53 | 11.2 (78.9%) |
| B | 6.0 | 14.4 | 79.6 C$_6$H$_5$Cl | 0.58 | 11.8 (83%) |
| C[3] | 8.0 | 12.0 | 80.0 C$_6$H$_5$Cl | 0.42 | 13.0 (91.55) |
| D[4] | 8.0 | 14.0 | 78.0 C$_6$H$_5$CH | 0.49 | 14.4 (101%) |

[1]all reactions based on 50 g 2,6 xylenol, solvent and methanol are reported as weight percents of the total reaction weight.
[2]in dl/g as measured in CHCl$_3$ at 30° C.
[3]0.75 g DBA (di-n-butylamine) and 0.3 g Aliquat (methyl-tri-n-octylammonium chloride) added.
[4]0.75 g DBA added.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. A heterogeneous polymer-bound catalyst for the oxidative coupling of phenolic monomers, said catalyst comprising a manganese (II) complex that is formed from a manganese (II) compound and a crosslinked vinyl resin having units that contain a benzoin oxime group.

2. The manganese (II) complex of claim 1 which is formed from a manganese (II) compound and a crosslinked vinyl resin having at least 1% of its units selected from units of the formula:

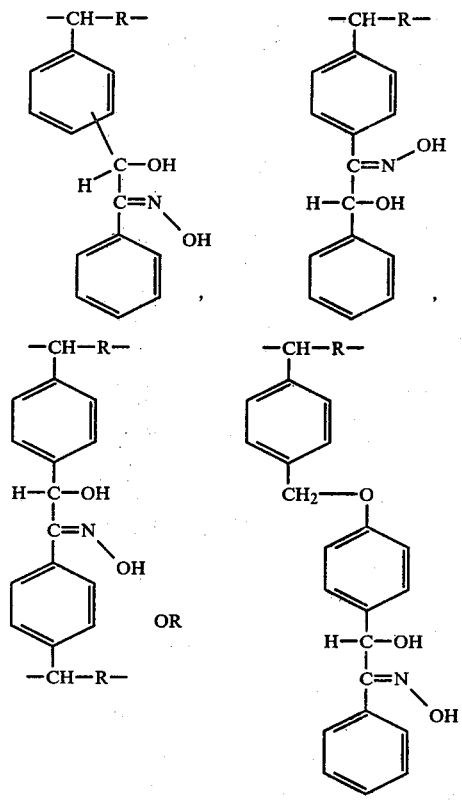

where R is the residue of a crosslinked vinyl resin.

3. The manganese (II) complex of claim 1 wherein the vinyl resi has at least 1% of its units selected from units of the formula

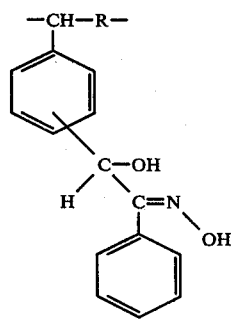

wherein R is the residue of a crosslinked styrene resin.

4. The manganese (II) complex of claim 3 wherein the styrene resin is a crosslinked copolymer of styrene, divinylbenzene and methylmethacrylate.

5. The manganese (II) complex of claim 4 wherein the manganese (II) compound is manganese (II) chloride.

6. The manganese (II) complex of claim 2 wherein the vinyl resin has at least 1% of its units selected from units of the formula:

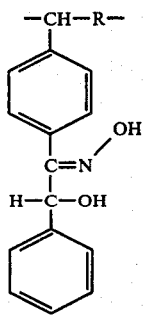

wherein R is the residue of a crosslinked styrene resin.

7. The manganese (II) complex of claim 6 wherein the vinyl resin is a styrene resin is crosslinked copolymer of styrene, divinylbenzene and methylmethacrylate.

8. The manganese (II) complex of claim 2 wherein the vinyl resin has at least 1% of its units selected from units of the formula:

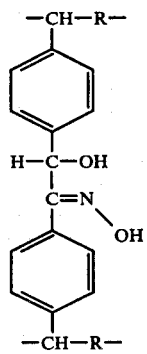

wherein R is the residue of a crosslinked styrene resin.

9. The manganese (II) complex of claim 8 wherein the R units are derived from styrene monomer.

10. The manganese (II) complex of claim 2 wherein the resin has at least 1% of its units selected from units of the formula:

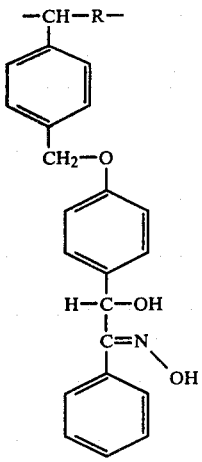

and R is the residue of a styrene resin.

11. The manganese (II) complex of claim 2 which is formed from a manganese (II) compound selected from the group consisting of manganese (II) chloride, manganese (II) bromide, manganese (II) iodide, manganese (II) carbonate, manganese (II) sulfate, manganese (II) acetate, manganese (II) nitrate and manganese (II) phosphate.

12. The manganese (II) complex of claim 2 wherein the manganese (II) compound is manganese (II) chloride.

* * * * *